(12) United States Patent
Harrebek et al.

(10) Patent No.: US 12,388,511 B2
(45) Date of Patent: Aug. 12, 2025

(54) DETECTION OF A CELL AND AN ANTENNA BEAM

(71) Applicant: NOKIA TECHNOLOGIES OY, Espoo (FI)

(72) Inventors: Johannes Harrebek, Aalborg (DK); Benny Vejlgaard, Gistrup (DK); Rafhael Amorim, Aalborg (DK); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 348 days.

(21) Appl. No.: 17/796,302

(22) PCT Filed: Jan. 27, 2021

(86) PCT No.: PCT/FI2021/050049
§ 371 (c)(1),
(2) Date: Jul. 29, 2022

(87) PCT Pub. No.: WO2021/152211
PCT Pub. Date: Aug. 5, 2021

(65) Prior Publication Data
US 2023/0142743 A1    May 11, 2023

(30) Foreign Application Priority Data
Jan. 31, 2020   (FI) .................................. 20205107

(51) Int. Cl.
*H04W 48/20*   (2009.01)
*H04B 7/0408*   (2017.01)
(Continued)

(52) U.S. Cl.
CPC .......... *H04W 48/20* (2013.01); *H04B 7/0408* (2013.01); *H04B 17/318* (2015.01); *H04W 16/28* (2013.01)

(58) Field of Classification Search
CPC .... H04W 48/20; H04W 16/28; H04B 7/0408; H04B 17/318
See application file for complete search history.

(56) References Cited

U.S. PATENT DOCUMENTS

2006/0025136 A1* 2/2006 Fujita ................ H04W 74/0816
455/436
2018/0048442 A1* 2/2018 Sang ................... H04W 72/046
(Continued)

FOREIGN PATENT DOCUMENTS

EP         3522666 A1    8/2019
WO    WO 2017/074488 A1    5/2017
WO    WO 2019/143862 A1    7/2019

OTHER PUBLICATIONS

"3rd Generation Partnership Project; Technical Specification Group Radio Access Network; Study on New Radio access technology; 60 GHz unlicensed spectrum (Release 14)", 3GPP TR 38.805 v14.0.0, (Mar. 2017), 17 pages.
(Continued)

*Primary Examiner* — Charles C Jiang
*Assistant Examiner* — Ryan C Kavleski
(74) *Attorney, Agent, or Firm* — ALSTON & BIRD LLP

(57) ABSTRACT

A system comprising a first access node that provides a first beacon and a second access node that provides a second beacon, the system further comprising a terminal device that performs, in parallel or semi-parallel, a first beam sweep and a second beam sweep, wherein the first beam sweep is performed by a first antenna panel and the second beam sweep is performed by a second antenna panel the terminal device obtains results from the first and the second beam sweep, wherein the results comprise at least a power measurement, and, based on the results, the terminal device identifies one of the first or the second access node and
(Continued)

initiates a connection to the identified first or the second access node.

21 Claims, 9 Drawing Sheets

(51) Int. Cl.
  *H04B 17/318* (2015.01)
  *H04W 16/28* (2009.01)

(56) References Cited

U.S. PATENT DOCUMENTS

| | | | |
|---|---|---|---|
| 2019/0141744 A1 | 5/2019 | Naghshvar et al. | |
| 2019/0306726 A1* | 10/2019 | Mo | H04B 7/0404 |
| 2020/0106508 A1* | 4/2020 | Raghavan | H01Q 21/28 |
| 2020/0366360 A1* | 11/2020 | Kotecha | H04J 11/0076 |
| 2021/0160706 A1* | 5/2021 | Wu | H04W 16/28 |

OTHER PUBLICATIONS

Apple, "View on Rel-16 MIMO Enhancement WI Multi-Panel Design Scope", 3GPP TSG RAN Meeting #83, RP-190236, (Mar. 18-21, 2019), 4 pages.

Intel Corporation, "Revised SID on Study on NR Beyond 52.6GHz", 3GPP TSG RAN Meeting #82, RP-182861, (Dec. 10-13, 2018), 4 pages.

International Search Report and Written Opinion for Patent Cooperation Treaty Application No. PCT/FI2021/050049 dated Apr. 26, 2021, 12 pages.

Notice of Allowance for Finland Application No. 20205107 dated Nov. 7, 2022, 7 pages.

Office Action for Finland Application No. 20205107 dated Sep. 7, 2020, 9 pages.

* cited by examiner

DETECTION OF A CELL AND AN ANTENNA BEAM

CROSS-REFERENCE TO RELATED APPLICATIONS

This application is a national phase entry of International Application No. PCT/FI2021/050049, filed Jan. 27, 2021, which claims priority to Finnish Application No. 20205107, filed Jan. 31, 2020, the contents of which are hereby incorporated by reference in their entirety.

FIELD

The following exemplary embodiments relate to a cellular communication network and detection of a cell and an antenna beam for communication with the cell.

BACKGROUND

Mobile networks enable freedom of movement to terminal devices. A terminal device may detect one or more cells and initiate a connection to a suitable cell. Thus, a terminal device may be able to detect multiple cells at the same time. Therefore, it may be beneficial to be able to efficiently detect the most suitable cell for a connection.

BRIEF DESCRIPTION OF THE INVENTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to another aspect there is provided an apparatus comprising means for performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided an apparatus comprising at least one processor, and at least one memory including a computer program code, wherein the at least one memory and the computer program code are configured, with the at least one processor, to cause the apparatus to: perform, in parallel or semi-parallel, a first beam sweep and a second beam sweep, wherein the first beam sweep is performed by a first antenna panel and the second beam sweep is performed by a second antenna panel, obtain the results from the first and the second beam sweep, wherein the results comprise at least a power measurement, and based on the results, identifying an access node, and initiate a connection to the access node.

According to another aspect there is provided a method comprising for performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided a computer program product readable by a computer and, when executed by the computer, configured to cause the computer to execute a computer process comprising performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided a computer program product comprising computer-readable medium bearing computer program code embodied therein for use with a computer, the computer program code comprising code for performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided a computer program comprising instructions for causing an apparatus to perform at least the following: performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided a computer readable medium comprising program instructions for causing an apparatus to perform at least the following: performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provided a non-transitory computer readable medium comprising program instructions for causing an apparatus to perform at least the following: performing, in parallel or semi-parallel, a first beam sweep and a second beam sweep, wherein the first beam sweep is performed by a first antenna panel and the second beam sweep is performed by a second antenna panel, obtaining the results from the first and the second beam sweep, wherein the results comprise at least a power measurement, and based on the results, identifying an access node, and initiating a connection to the access node.

According to another aspect there is provide a system comprising a first access node that provides a first beacon and a second access node that provides a second beacon, the system further comprising a terminal device that performs, in parallel or semi-parallel, a first beam sweep and a second beam sweep, wherein the first beam sweep is performed by a first antenna panel and the second beam sweep is performed by a second antenna panel, the terminal device obtains results from the first and the second beam sweep, wherein the results comprise at least a power measurement, and, based on the results, the terminal device identifies one of the first or the second access node and initiates a connection to the identified first or the second access node.

According to another aspect there is provide a system comprising means for providing a first beacon by a first access node and a second beacon by a second access node, performing by a terminal device, in parallel or semi-parallel, a first beam sweep and a second beam sweep, wherein the first bean sweep is performed by a first antenna panel and the second beam sweep is performed by a second antenna panel; obtaining results from the first and the second beam sweep, wherein the results comprise at least a power measurement, and based on the results, identifying one of the first or the second access node; and initiating a connection from the terminal device to the identified access node.

LIST OF DRAWINGS

In the following, the invention will be described in greater detail with reference to the embodiments and the accompanying drawings, in which FIG. 1 illustrates an exemplary embodiment of a communication system.

DESCRIPTION OF EMBODIMENTS

Figure 1:
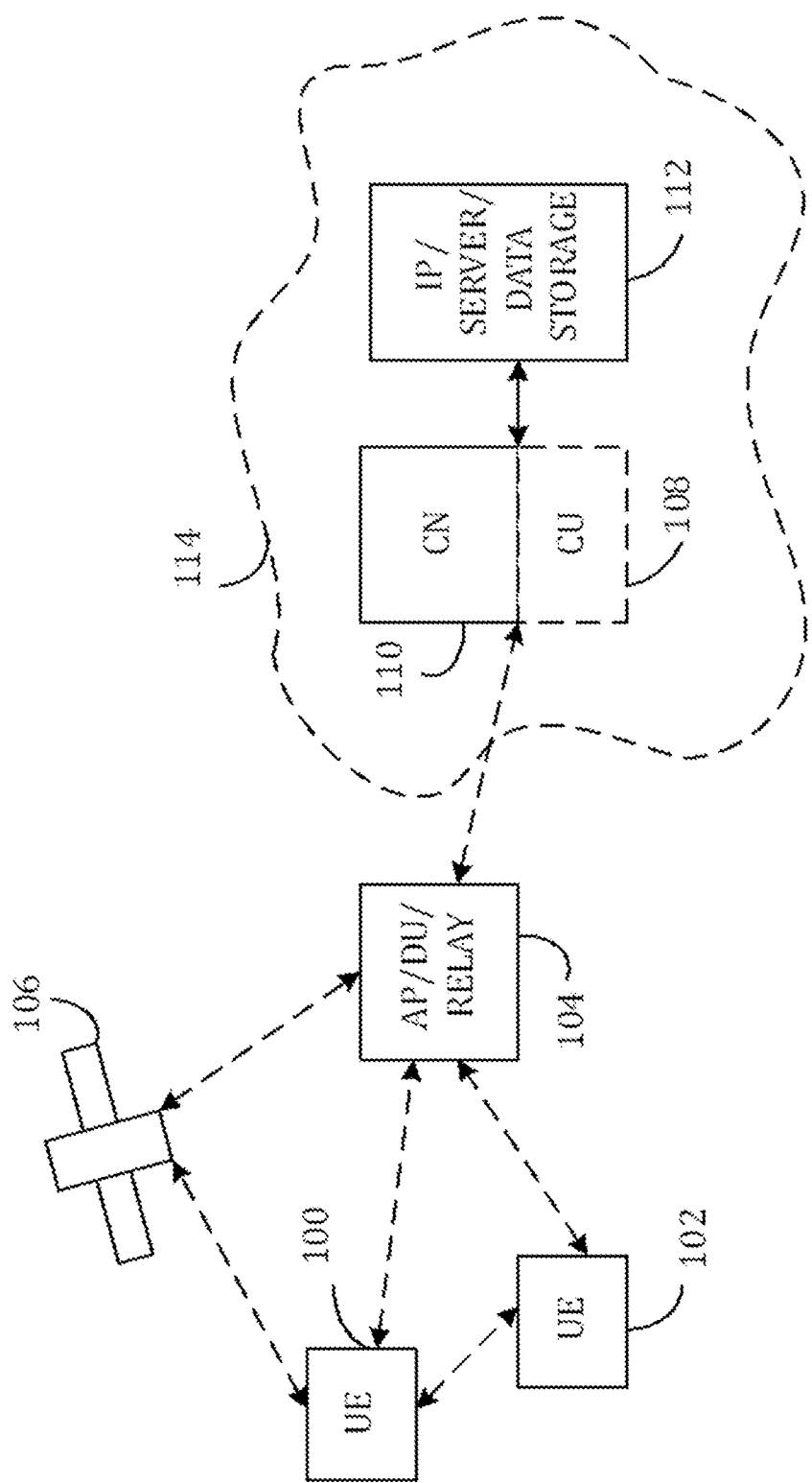

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

Figure 2:
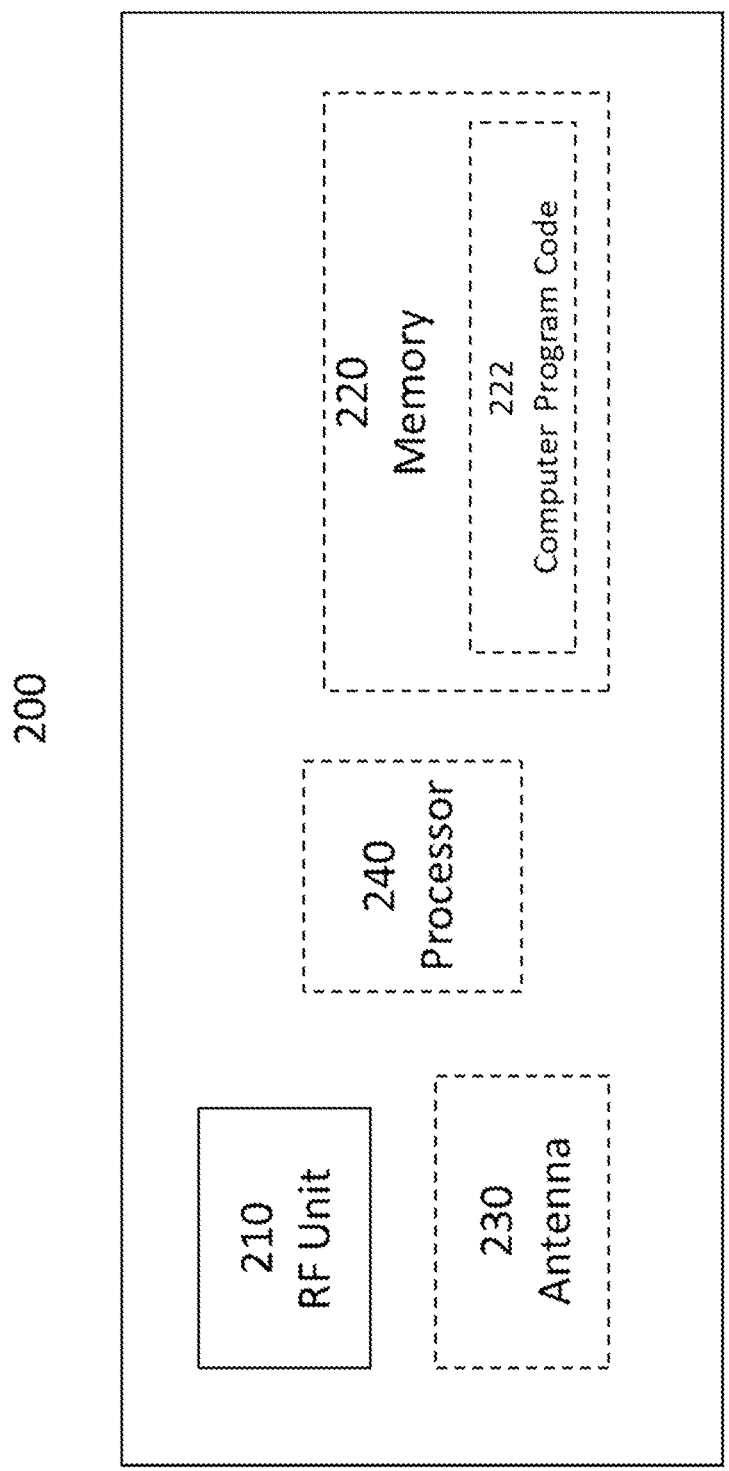
FIG. 2 illustrates an exemplary embodiment of an apparatus.

FIG. 2 illustrates an apparatus 200, which comprises a radio frequency unit, RF unit 210. The RF unit 210 may be comprised in an apparatus that comprises an antenna 230, a processor 240 and/or a memory 220. Alternatively, the RF unit may be connected to one or more of the antenna 230, the processor 240 and/or the memory 220. The apparatus 200 may be an apparatus such as, or comprised in, a terminal device or an access node for example. It is to be noted that the RF unit may also be called as an RF front end or an RF module.

The RF Unit 210 enables wireless connectivity to external networks. The RF Unit 210 is connected to, or comprises, the antenna 230. The antenna 230 may comprise one or more antennas. The RF unit 210 may comprise an integrated circuit or a set of integrated circuits that provide the wireless communication capability for the apparatus 200. The RF unit 210 is configured to transmit and receive radio frequency signals and, in some exemplary embodiments, to process the signals. It is to be noted that the RF unit 210 may comprise hardware and/or software for realizing communication connectivity according to one or more communication protocols. In some exemplary embodiments, the RF unit 210 is configured to modulate a radio wave to carry data and to transmit the radio wave. Additionally, or alternatively, the RF unit 210 may be configured to receive a modulated radio wave and to demodulate the received modulated radio wave. Further, additionally or alternatively, the RF unit 210 may comprise a microcontroller configured to handle data packetization and/or managing a communications protocol.

The processor 240 interprets computer program instructions and processes data. The processor 240 may comprise one or more programmable processors. The processor 240 may comprise programmable hardware with embedded firmware and may, alternatively or additionally, comprise one or more application specific integrated circuits, ASICs. The processor 240 is coupled to a memory 220. The processor is configured to read and write data to and from the memory 220. The memory 220 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 220 stores computer readable instructions that are execute by the processor 240. For example, non-volatile memory stores the computer readable instructions and the processor 240 executes the instructions using volatile memory for temporary storage of data and/or instructions. The computer readable instructions may have been pre-stored to the memory 222 or, alternatively or additionally, they may be received, by the apparatus, via electromagnetic carrier signal and/or may be copied from a physical entity such as computer program product. Execution of the computer readable instructions causes the apparatus 200 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

It is to be noted that the apparatus 200 may further comprise various component not illustrated in the FIG. 2. The various components may be hardware component and/or software components.

A cellular communication network utilizes radio frequency bands for wireless communication. Yet, various frequencies may require different implementations for efficient utilization of frequencies. For example, frequencies above 52.6 GHz may introduce, compared to lower frequencies, one or more of the following issues when utilized in 5G for example: higher phase noise, extreme propagation loss due to high atmospheric absorption, lower power amplifier efficiency, and strong power spectral density regulatory requirements, compared to lower frequency bands. It may also be that compared to lower frequencies, frequencies above 52.6 GHz may contain larger spectrum allocations and larger bandwidths.

It may be determined that the higher the frequency range utilized for cellular communication, the higher the path loss. To compensate for the higher path loss, an antenna beam gain is to be higher as well. If a terminal device comprises a plurality of antennas, that may be panel antennas, it is possible to have a full spherical coverage with a suitable number of antennas. In such a case, each panel antenna used may increase antenna gain by applying beam forming. For example, 3 or 5 panel antennas may be used to get a spherical coverage around the terminal device. In an exemplary embodiment, for a full link budget an antenna beam width may be only 3.6 degrees and therefore a full spherical sweep 3.6 degrees 3 dB bandwidth would require, using a 1×24 antenna array, 100 individual measurements. A link budget may be understood as an accounting of power gains and losses that a communication signal used in the cellular communication system experiences from a transmitter, through a medium to the receiver. It accounts for the attenuation of the transmitted signal due to propagation, as well as the antenna gains and feedline and other losses, as well as the amplification of the signal in the receiver or any repeaters it passes through. An antenna array may be understood as multiple connected antennas which work together as a single antenna, to transmit or receive radio waves. In some examples, an antenna array may achieve higher gain, that is a narrower beam of radio waves, than could be achieved by a single element. It may be that the larger the number of individual antenna elements used, the higher the gain and the narrower the beam. In some examples an antenna array may comprise up to thousands of individual antennas. An antenna array may be helpful in achieving higher gain, providing path directivity which increases communication reliability, cancelling interference from specific directions, steering the radio beam electronically to point in different directions, and/or radio direction finding.

In some exemplary embodiments, a beam management procedure comprises an initial beam search during which a terminal device may scan the synchronization signal block, SSB, downlink reference signals and determine the best SSB beam from an access node using a static broad banded radiation pattern. Next, the terminal device may sweep through possible qualifier beams to align its beam towards the access node. However, this may require a significant number of beam sweeps to be performed by the terminal device or a reduction in link budget, which may cause a cell size to be reduced.

It may therefore be beneficial to cause an RF unit, such as the RF unit 210, be able to identify an access node, such as a gNB, with limited resources. It is to be noted that the RF unit may also be called as an RF front-end in some exemplary embodiments. As more than one access node may provide a cell such that those cells overlap, it is also beneficial to be able to identify by which access node each cell is provided. A cell may be, in some exemplary embodiments, for example a microcell or femtocell or any other suitable cell. Thus, an access node, such as a gNB, may provide a beacon with coding e.g. based on a primary synchronization signal, PSS, coding sequence. In an exemplary embodiment, multiple beacons may be encoded with a coding scheme that enables a terminal device to detect and measure multiple beacons, that are provided by multiple access nodes, in parallel with one or more RF units comprised in the terminal device. By decoding the beacons, the one or more RF units may identify the access node. An access node such as a gNB may be identified by detecting its ID, a gNB ID.

Figure 3:
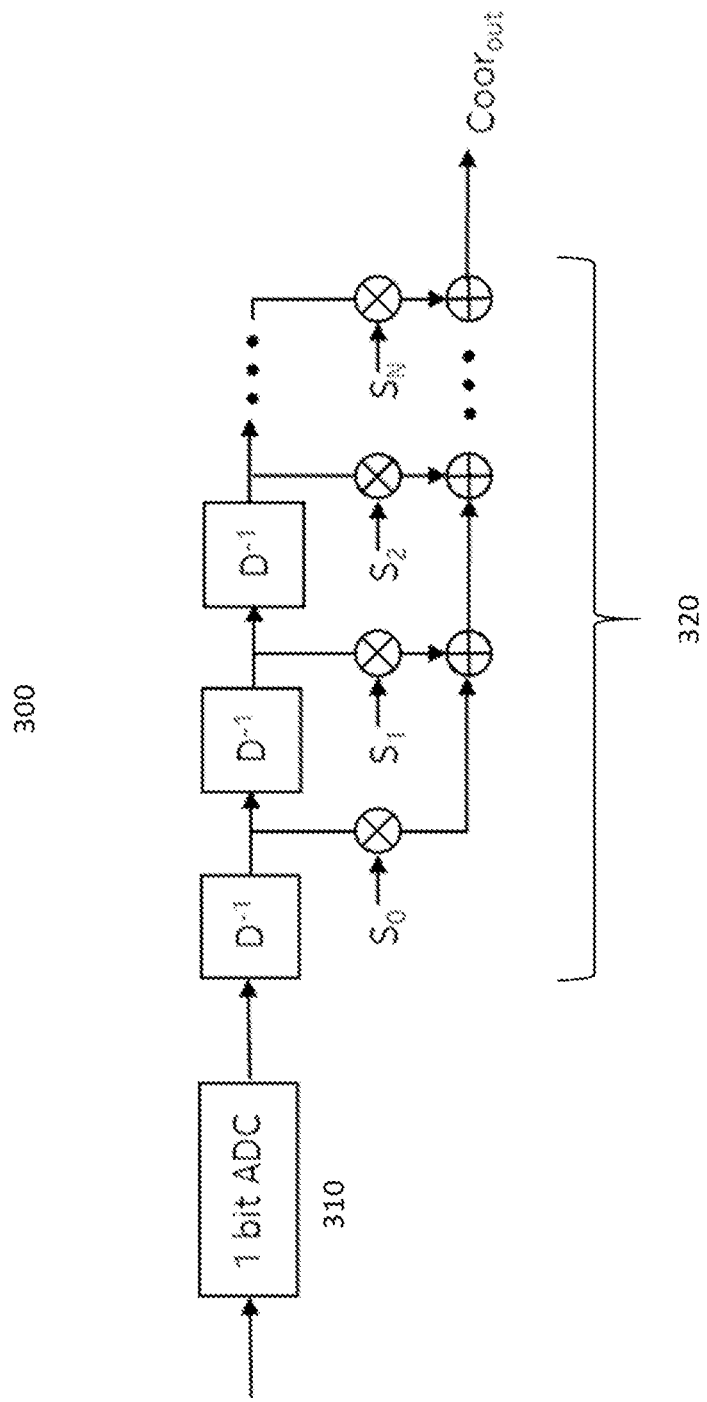
FIG. 3 illustrates an exemplary embodiment of a correlator.

FIG. 3 illustrates an exemplary embodiment of a correlator 300 that may be comprised in an RF unit, such as the RF unit 210. The correlator comprises a 1-bit analog-to-digital converter, ADC, 310 together with a tapped delay line 320, which enables determining a correlation function of multiple gNB ID codes and maximizing auto correlation properties such that the RF unit may identify the gNB ID, power received and an antenna array codebook entry.

In general, a tapped delay line may be understood as a delay line with at least one tap, which extracts a signal output from somewhere within the delay line and sums with other taps to form an output signal. The tap may additionally scale the output signal before summing it. The tap may further be interpolating or non-interpolating. A non-interpolating tap may extract the signal at some fixed integer delay relative to the input. Thus, the tap may implement a shorter delay line within a larger one. In a digital context, as in the exemplary embodiment of FIG. 3, the delay line may enable a signal to be delayed by a number of samples. A delay by one sample, in the exemplary embodiment of FIG. 3 is notated as $D^{-1}$, and there are N delays in the tapped delay line 320.

Figure 4:
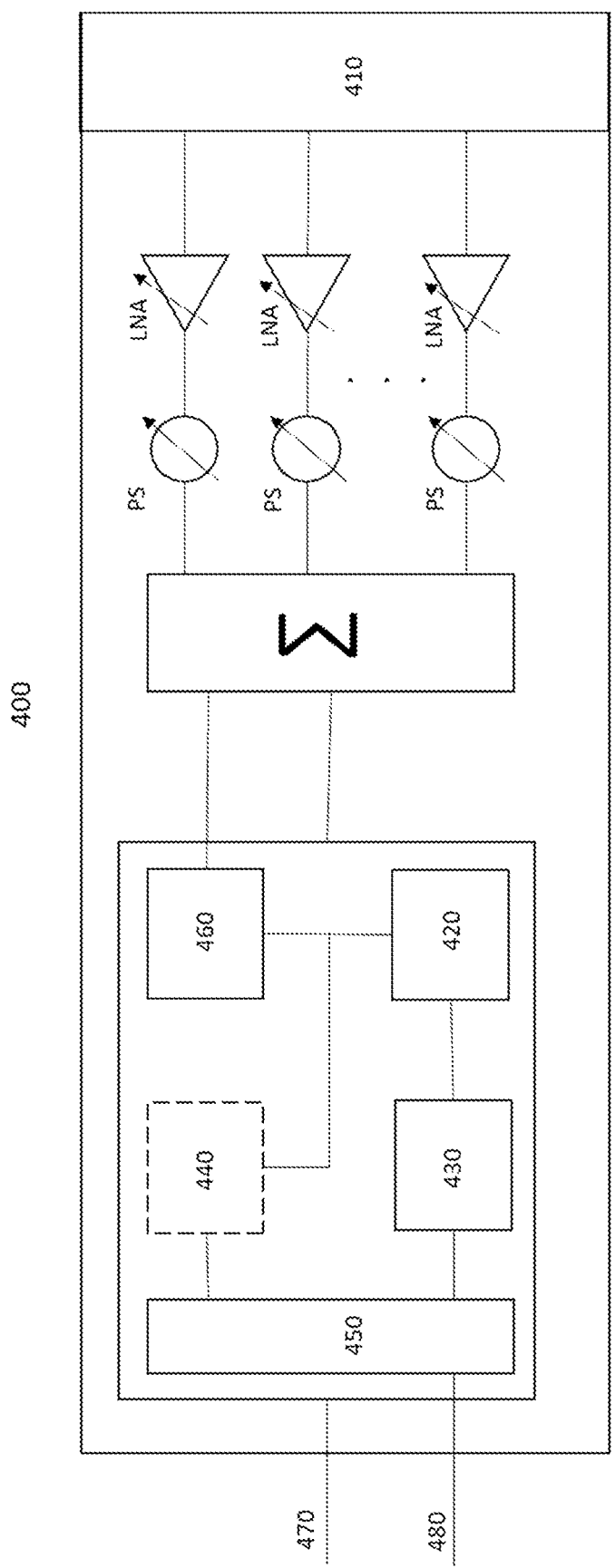
FIG. 4 illustrates an exemplary embodiment of an RF unit.

FIG. 4 illustrates an exemplary embodiment of an RF unit 400, which is an RF front end configured to enable detection of a gNB identification. In this exemplary embodiment the RF unit 400 comprises an antenna panel 410. In some alternative exemplary embodiments, the antenna panel 410 may be connected to the RF unit 400. The RF unit 400 further comprises a plurality of low noise amplifiers, LNA, and phase shifters, PS, as well as a summing unit $\Sigma$. The RF unit 400 further comprises, in this exemplary embodiment, a power integrator 420, a comparator 430, a result register 450, a filter 460 and optionally, a correlator 440, which may be the correlator 300 illustrated in FIG. 3. The RF unit 400 further comprises a signal line 480 control signal, CRTL, and a signal line 470 for radio frequency, RF, and/or intermediate frequency, IF.

Figure 5:
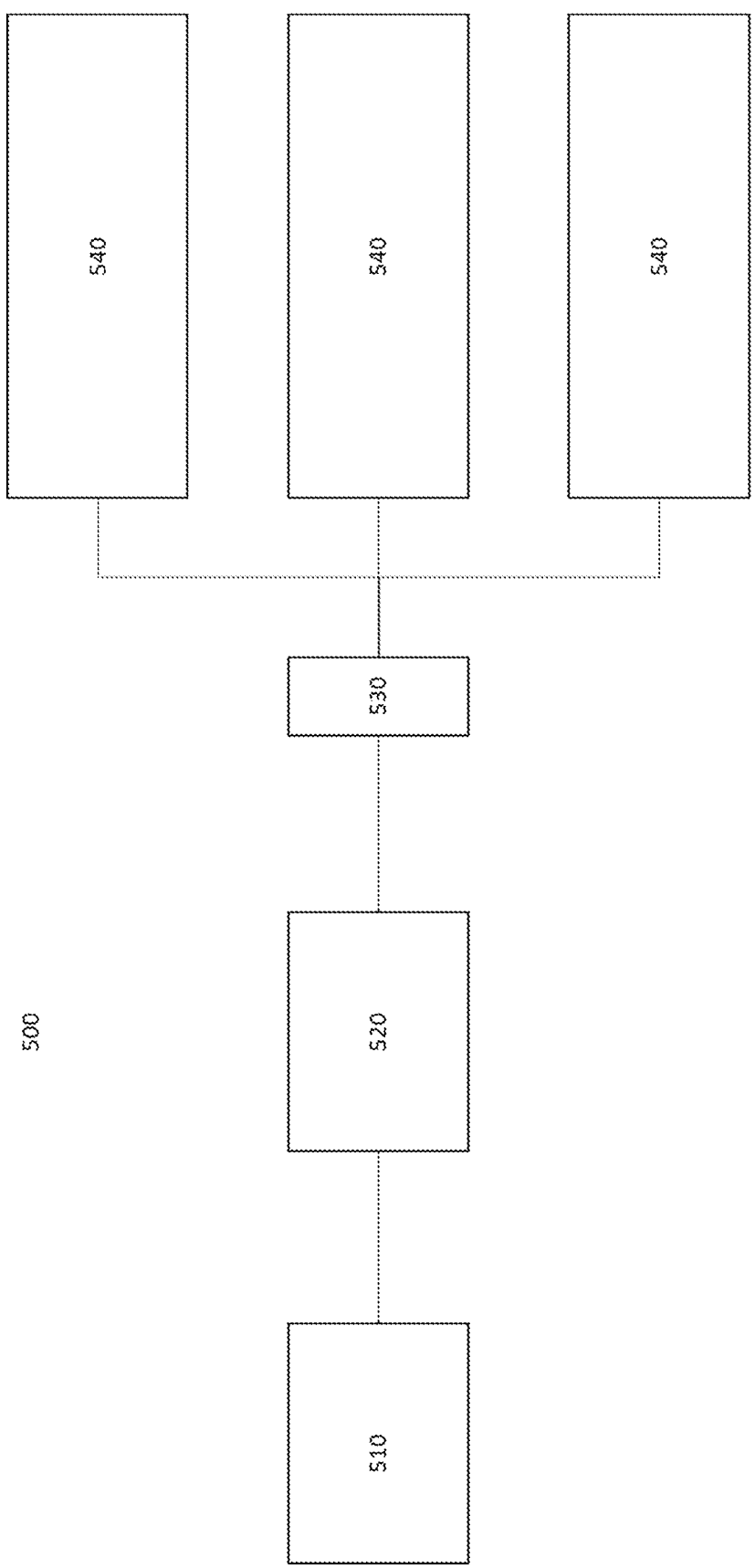
FIG. 5 illustrates an exemplary embodiment of a unit.

FIG. 5 illustrates a unit 500, which may be a logical unit, comprised in a terminal device. The unit 500 may be configured to detect a cell provided by an access node such as a gNB. The unit 500 comprises a baseband control unit 510. The baseband control unit 510 may, in some exemplary embodiments, be considered as a control and processing unit. The baseband control unit 510 may be caused to perform for example signal processing and/or high-level control.

The unit 500 further comprises a transceiver unit 520, which may be a logical unit. The transceiver unit 520 may be caused to perform for example RF control, RF logic, filtering, gain control and/or up/down conversion.

The unit 500 may also comprise a switch 530 and one or more RF units, such as the RF unit 400. In this exemplary embodiment there are three RF units 540, but in some alternative exemplary embodiments, there may be another amount of RF units. The RF units 540 are connected to the transceiver unit 520 via the switch 530 and the transceiver unit 520 is connected to the baseband control unit 510. An RF unit 540 may be caused to comprise information regarding for example code book entries such as antenna panel configurations, gNB identifications, IDs, to be scanned, and/or time and periodicity for terminal device antenna panel measurements. At least some of the comprised information may be stored in a result register such as the result register 450. The RF unit 540 may further be caused to provide to the transceiver 520 for example a detected gNB ID, information regarding received power and/or information regarding a code book entry.

Figure 6:
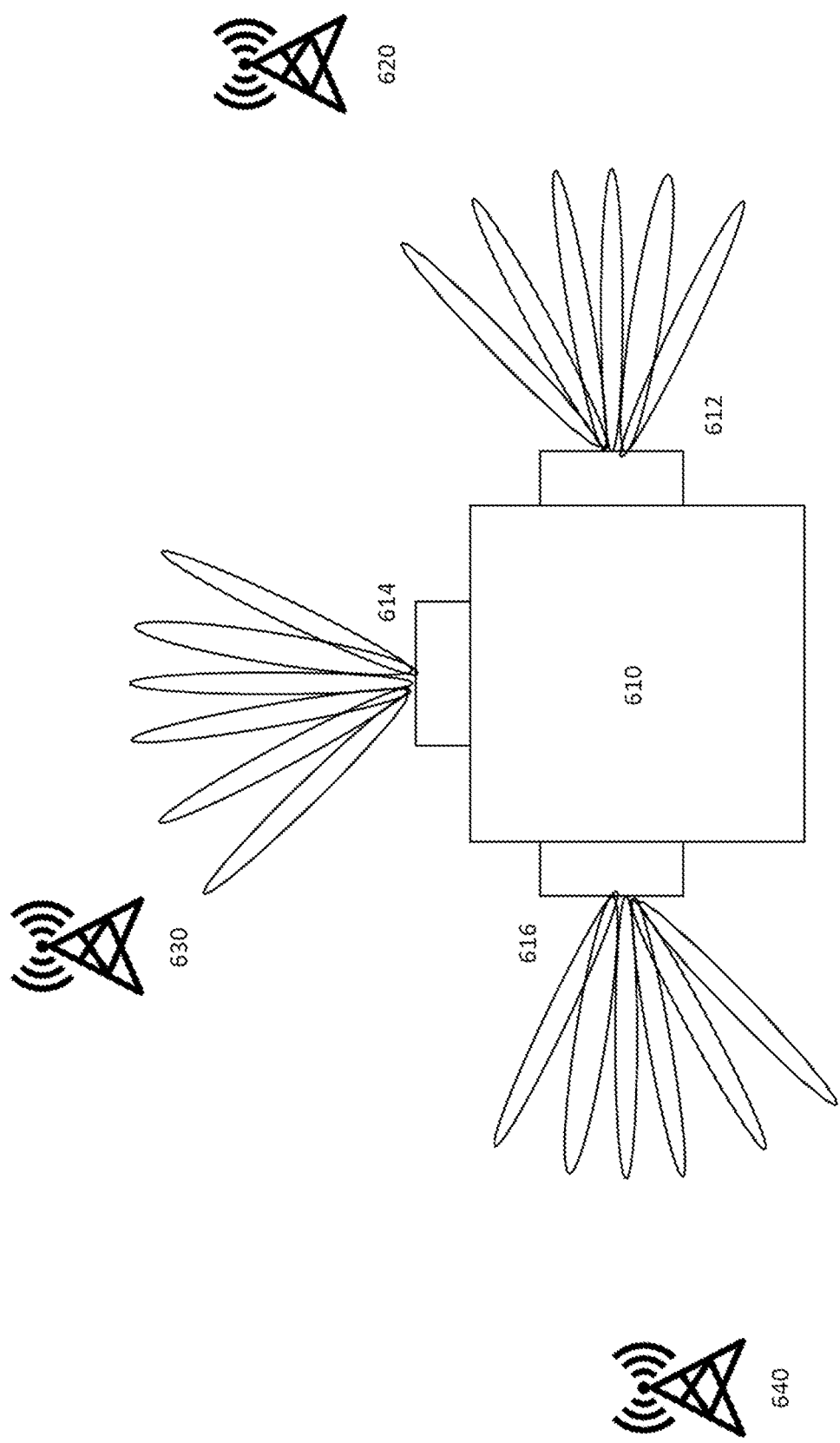
FIG. 6 illustrates an exemplary embodiment of a terminal device.

FIG. 6 illustrates an exemplary embodiment in which a terminal device 610 comprises the unit 500. The three antenna panels in the three RF units comprised in the terminal device 610 may initiate RX beam sweeps 612, 614 and 616 simultaneously. It is to be noted that although there are three antenna panels in this exemplary embodiment, in some other exemplary embodiments there may be a different amount of antenna panels. In general, a beam sweep may be understood as a technique to transmit beams in predefined directions in a burst in a regular interval. The beam sweep may be a spherical beam sweep which may also be called as an omnidirectional beam sweep. It is to be noted that in some exemplary embodiments, each combined sweep pattern for each antenna panel may have a limited spherical coverage and therefore multiple antenna panels may be used to achieve a full spherical coverage. In this exemplary embodiment, the access nodes 620, 630 and 640, which are gNBs, transmit beacons that are encoded. The encoding may be for example in-band or out-of-band with a space-time BPSK modulated code, such as observed in the Walsh codes for CDMA technologies. In this exemplary embodiment, the beam sweeps are performed using large antenna arrays obtaining high gain but narrow beam width.

The three RF units comprised in the terminal device 610 each populate, in this exemplary embodiment, a measurement table, which may be stored in the results register for example, with an identified gNB ID, received signal strength indicator, RSSI, and an associate RX beam codebook entry. It is to be noted that in this exemplary embodiment, each RF unit populates a table dedicated for it. Next, in this exemplary embodiment, a baseband processing unit retrieves information from the measurement tables. The baseband processing unit may further sort the retrieved information. The sorting may for example be made based on detected RSSIs. Based on the sorted list, the baseband processing unit may connect to the associated RF unit and attempt successful decoding. Based on one or more successful decoding, the best gNB may be determined and connection process may be initiated towards the best gNB.

Figure 7:
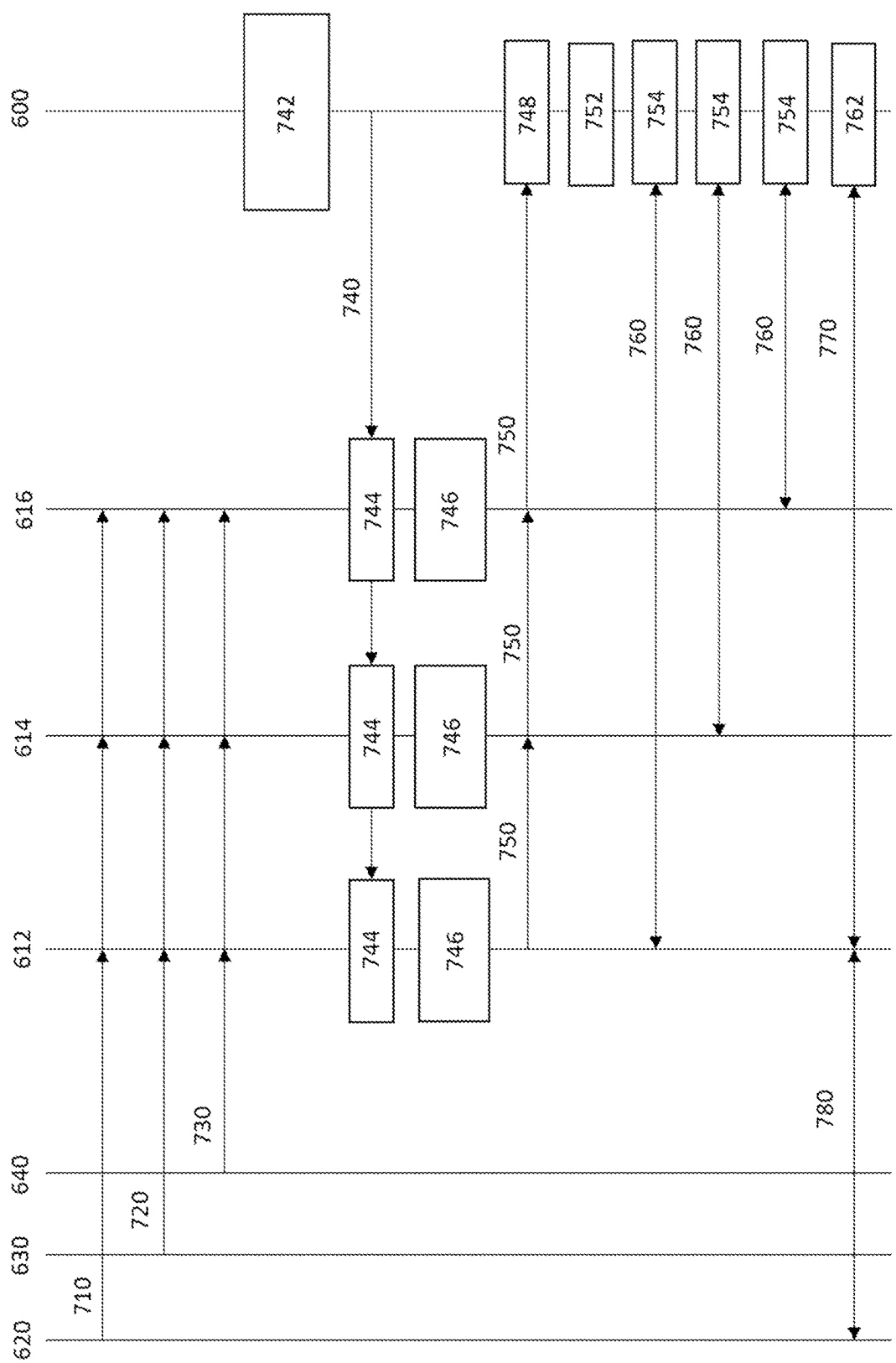
FIG. 7 and FIG. 8 illustrate examples of signalling charts.

FIG. 7 illustrates signalling according to an exemplary embodiment. In this exemplary embodiment, there are three access nodes, the access nodes 620, 630 and 640 as illustrated in FIG. 6. There are also the three antenna panels 612, 614 and 616, the antenna panels are comprised in respective RF units, which may be RF units like the RF unit 400, as also illustrated in FIG. 6. There is also the terminal device 600 that comprises the control unit 510 and the transceiver unit 520 as illustrated in FIG. 5. It is to be noted that although the antenna panels, that are comprised in the respective RF units, may also be comprised in the terminal device 600 even though they are illustrated separately in FIG. 7. The RF units are, in this exemplary embodiment, caused to measure power and gNB ID for both single or multiple beam codebook entries. The RF units may additionally be operated independent of the state of the terminal device 600, for example, independent of the state of the transceiver or the baseband processing unit. The RF front end beam sweeps performed by the antenna panels 612, 614 and 616 are caused to determine the best path and, indirectly, angle of arrival (AoA) towards a gNB by demodulating the gNB ID. It is to be noted that the AoA may be determined indirectly by obtaining the best beam, i.e the direction of the gNB relative to the UE connection. A beam sweep performed by an antenna panel may be used to track a certain beam and to identify the best beam towards gNB. The beam sweep may further be used to do antenna panel selection within the UE. In this exemplary embodiment panel switching, beam management and/or inter-cell mobility are also supported. Additionally, both idle/inactive and connected state of the terminal device 600 may be supported. The 1-bit ADC and tapped delay line comprised in a RF unit may correlate the received signal with known reference signal for the gNB color code, which enables low cost and low power implementation.

In FIG. 7, the access nodes 620, 630 and 640 first transmit beacons that are coded 710, 720 and 730. Then the terminal device 600 may initiate parallel beacon scans 742 and transmit a scan trigger signal 740 to the antenna panels 612, 614 and 616, which then run the beacon scans 744 and populate the measurement tables 746 as described above. It is to be noted that the beacon scans may also be semi-parallel. Semi-parallel may be understood as antenna panels having different size and/or different codebooks. The results are then transmitted 750 to the terminal device 600 as the terminal device 600 requests the results 748. This may be done as described above. Next, the results may be sorted 752 and the results may be confirmed 754 by connecting 760 to the antenna panel from which a result to be confirmed was obtained. As a gNB, to which a connection is to be established, is identified, a connection procedure may be initiated for example by initiating a random access procedure using the antenna panel that detected the gNB to which the connection is to be established 762. Thus, a connection 770 may be stablished between a baseband processing unit and an RF unit comprised in the terminal device 600 thereby performing a random-access procedure 780.

Thus, the measurements performed in the above exemplary embodiments may be used for initial beam selection, panel switching, beam management and/or inter-cell mobility for example.

As was mentioned above, an RF unit optionally comprises a correlator. In an exemplary embodiment, in which there are three RF units such as RF units 400 comprised in the terminal device 600, but the correlator is not present, a gNB ID may not be detected. However, power and/or RSSI may be measured. In this exemplary embodiment, the beacons provided by the access nodes 620, 630 and 640 may not comprise a coded ID. Yet, the panels 612, 614 and 616 may still perform the autonomous beam sweeping searching for power, but in this case the measurement report will not be including gNB identification. In this exemplary embodiment, the baseband processing unit may connect to each RF unit and attempt to decode on identified beam indexes with measured power above a certain threshold. In a successful case the power measured is from a valid gNB. In an unsuccessful case the power measured was interference and that beam index will be removed from the candidate list with baseband processing unit continuing with decoding on next beam index on the list.

Figure 8:
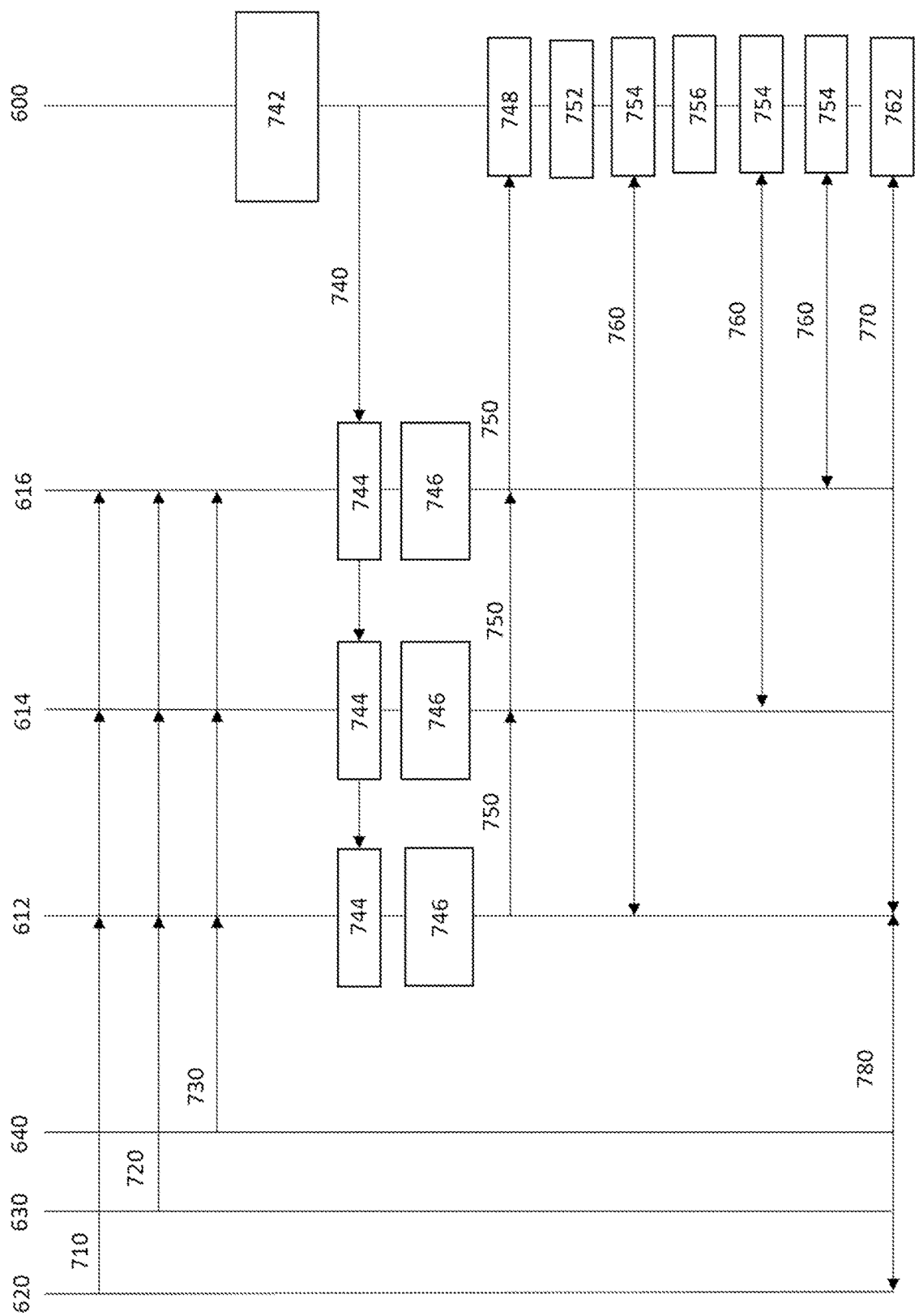

FIG. 8 illustrates a signalling chart of this exemplary embodiment. In this exemplary embodiment, the access nodes 620, 630 and 640 first transmit beacons, that are in this case not coded, 710, 720 and 730. Then the terminal device 600 may initiate parallel beacon scans 742 and transmit a scan trigger signal 740 to the antenna panels 612, 614 and 616, which then run the beacon scans 744 and populate the measurement tables 746 as described above. The results are then transmitted 750 to the terminal device 600 as the terminal device 600 requests the results 748. This may be done as described above. Next, the results may be sorted 752 and the results may be confirmed 754 by connecting 760 to the antenna panel from which a result to be confirmed was obtained. It is then determined if the decoding fails or not, in case it fails, the index is removed from the list 756. When a gNB, to which a connection is to be established, is identified, a connection procedure may be initiated for example by initiating a random-access procedure using the antenna panel that detected the gNB to which the connection is to be established 762. Thus, a connection 770 may be established between a baseband processing unit and an RF unit comprised in the terminal device 600 thereby performing a random-access procedure 780.

Figure 9:
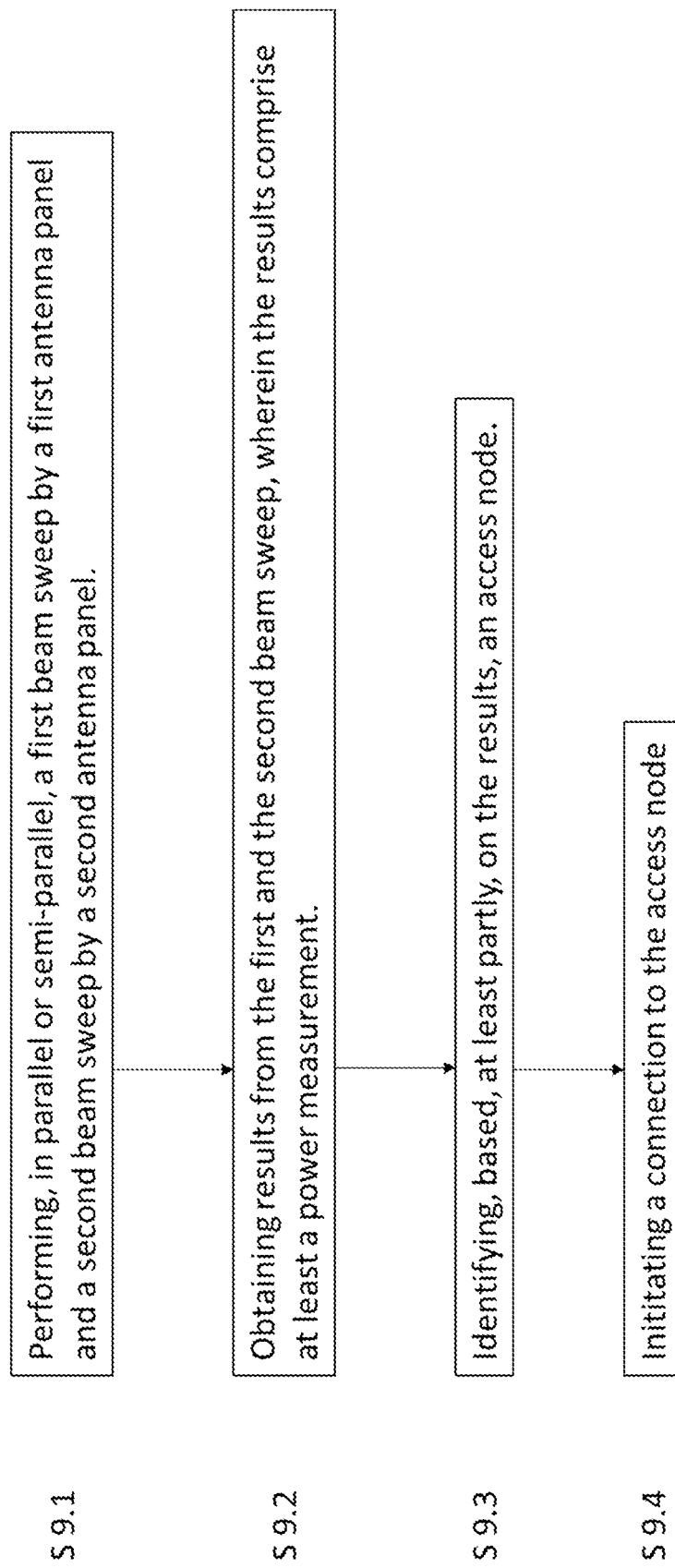
FIG. 9 illustrates a flow chart according to an embodiment.

FIG. 9 illustrates a flow chart according to an exemplary embodiment. A first beam sweep and a second beam sweep are performed in parallel or semi-parallel. The first beam sweep is performed by a first antenna panel and the second beam sweep is performed by a second antenna panel. This is illustrated in S 9.1. Next, results from the first beam sweep and the second beam sweep are obtained. The results comprise at least a power measurement. This is illustrated in S 9.2. Next, based at least partly on the obtained results, an access node is identified. This is illustrated in S 9.3. Then, a connection is initiated to the access node, which was identified in S 9.3, as is illustrated in S 9.4.

The above described exemplary embodiments may enable low power analogue beam tracking in a terminal device with low current consumption. This may have advantages such as reducing scanning time for initial acquisition and neighbor cell measurements and/or to save current consumption during initial acquisition and neighbor cell measurements. If for example a terminal device comprises N antenna panels and 20% energy is used on one SSB reading for a UE panel, 40% energy is used on one SSB reading for a UE transceiver and 40% energy is used on one SSB reading for a UE baseband, then the time saving of the invention may be for example 1/N and the current consumption saving may be for example (0.2*N+1)/N→0.2+1/N.

When communication between a terminal device and a gNB is to be established using a frequency band of mmWaves, beam forming is used both at gNB and terminal device side. It is beneficial if the terminal device is able to perform a beam sweep in all directions, in other words, perform a spherical sweep to detect cells provided by one or more gNBs. The exemplary embodiments described above enable such spherical sweeps. Further, the exemplary embodiments above reduce the HW cost involved and increase power efficiency in case the spherical sweeps are performed parallel or semi-parallel instead of performing them sequentially. The exemplary embodiments described above may also have the effect of reducing scanning time.

Further, the exemplary embodiments above allow the terminal device to know the direction of the gNB.

The advantages that the above-described exemplary embodiments may introduce comprise for example the following: Detecting a neighbour cell and what kind of cell the neighbour cell is enabled. Yet, it is possible to skip a part relating to identifying a gNodeB and it may not be necessary to decode each RF front end. Parallel monitoring of antenna panels without activating base band may also be enabled by the exemplary embodiments described above as well as reduction of time and/or current consumption needed. In some exemplary embodiment, power may be saved by 50%.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:

perform, in parallel or semi-parallel, a first beam sweep and a second beam sweep, wherein the first beam sweep is performed by a first antenna panel and the second beam sweep is performed by a second antenna panel;

obtain results from the first and the second beam sweeps, wherein the results comprise one or both of (i) a power measurement associated with one or more beam indexes and (ii an access node identifier for respective ones of a plurality of identified access nodes;

responsive to the results comprising an access node identifier, identify an access node based on the results;

responsive to the results not comprising an access node identifier, attempt to decode on identified beam indexes having a power measurement that satisfies a threshold and identify the access node based on a successful decoding; and initiate a connection to the access node.

2. An apparatus according to claim 1, wherein the apparatus is further caused to decode a coded gNB beacon.

3. An apparatus according to claim 1, wherein (i) the results are stored in a result register and (ii) the decoding is performed by a correlator comprising a tapped delay line.

4. An apparatus according to claim 1, wherein the first and the second beam sweep are performed at a frequency band of millimeter waves.

5. An apparatus according to claim 1, wherein the first and the second antenna panels are connected to a transceiver via a switch.

6. An apparatus according to claim 1, wherein the apparatus is further caused to perform a third sweep by a third antenna panel.

7. An apparatus according to claim 1, wherein a spherical beam sweep is obtained using at least the first and the second antenna panel.

8. An apparatus according to claim 1, wherein the apparatus is a terminal device.

9. An apparatus according to claim 1, wherein the apparatus is further caused to:
populate, responsive to obtaining the results, one or more measurement tables with the access node identifier for respective ones of the plurality of identified access nodes, a received signal strength indicator, and a beam codebook entry associated with the first antenna panel or the second antenna panel, wherein the one or more measurement tables comprise a measurement table associated with respective ones of the first antenna panel and the second antenna panel.

10. An apparatus according to claim 1, wherein, responsive to the results not comprising an access node identifier and to an unsuccessful decoding on an identified beam index, the apparatus is further caused to remove the beam index from a candidate list of beam indexes.

11. A method comprising:
performing, in parallel or semi-parallel, a first beam sweep and a second beam sweep, wherein the first beam sweep is performed by a first antenna panel and the second beam sweep is performed by a second antenna panel;
obtaining results from the first and the second beam sweeps, wherein the results comprise one or both of (i) a power measurement associated with one or more beam indexes and (ii) an access node identifier for respective ones of a plurality of identified access nodes;
responsive to the results comprising an access node identifier, identifying an access node based on the results;
responsive to the results not comprising an access node identifier, attempting to decode on identified beam indexes having a power measurement that satisfies a threshold and identifying the access node based on a successful decoding; and
initiating a connection to the access node.

12. A method according to claim 11, the method further comprising:
decoding a coded gNB beacon.

13. A method according to claim 12, wherein the decoding is performed by a correlator comprising a tapped delay line.

14. A method according to claim 11, wherein the results are stored in a result register.

15. A method according to claim 11, wherein the first and the second beam sweep are performed at a frequency band of millimeter waves.

16. A method according to claim 11, wherein the first and the second antenna panels are connected to a transceiver via a switch.

17. A method according to claim 11, the method further comprising:
performing a third sweep by a third antenna panel.

18. A system comprising a first access node that provides a first beacon and a second access node that provides a second beacon, the system further comprising: a terminal device that performs, in parallel or semi-parallel, a first beam sweep and a second beam sweep, wherein the first beam sweep is performed by a first antenna panel and the second beam sweep is performed by a second antenna panel;
the terminal device obtains results from the first and the second beam sweeps, wherein the results comprise one or both of (i) a power measurement associated with one or more beam indexes and (ii) an access node identifier for respective ones of a plurality of identified access nodes;
responsive to the results comprising an access node identifier, the terminal device identifies one of the first or the second access node based on the results;
responsive to the results not comprising an access node identifier, the terminal device attempts to decode on identified beam indexes having a power measurement that satisfies a threshold and identifies one of the first or the second access node based on a successful decoding; and
the terminal device initiates a connection to the identified first or the second access node.

19. A system according to claim 18, wherein the first access node is a first gNB and the second access node is a second gNB.

20. A system according to claim 18, wherein the first beacon comprises a first encoded identification and the second beacon comprises a second coded identification.

21. A non-transitory computer readable medium comprising program instructions for causing an apparatus to perform at least the following:
performing, in parallel or semi-parallel, a first beam sweep and a second beam sweep, wherein the first beam sweep is performed by a first antenna panel and the second beam sweep is performed by a second antenna panel;
obtaining results from the first and the second beam sweeps, wherein the results comprise one or both of (i) a power measurement associated with one or more beam indexes and (ii) an access node identifier for respective ones of a plurality of identified access nodes;
responsive to the results comprising an access node identifier, identifying an access node based on the results;
responsive to the results not comprising an access node identifier, attempting to decode on identified beam indexes having a power measurement that satisfies a threshold and identifying the access node based on a successful decoding; and
initiating a connection to the access node.

* * * * *